(12) United States Patent
Liu

(10) Patent No.: US 8,292,364 B2
(45) Date of Patent: Oct. 23, 2012

(54) VEHICLE SEAT HEAD REST WITH BUILT-IN ELECTRONIC APPLIANCE

(76) Inventor: Edward Liu, City of Industry, CA (US)

( * ) Notice: Subject to any disclaimer, the term of this patent is extended or adjusted under 35 U.S.C. 154(b) by 244 days.

(21) Appl. No.: 12/583,887

(22) Filed: Aug. 26, 2009

(65) Prior Publication Data
US 2011/0049943 A1 Mar. 3, 2011

(51) Int. Cl.
A47C 7/62 (2006.01)
(52) U.S. Cl. .................................... 297/217.3
(58) Field of Classification Search .............. 297/217.3, 297/452.38
See application file for complete search history.

(56) References Cited

U.S. PATENT DOCUMENTS

| | | | | |
|---|---|---|---|---|
| 4,647,980 | A * | 3/1987 | Steventon et al. | 348/837 |
| 6,786,547 | B1 * | 9/2004 | Chu | 297/220 |
| 6,905,167 | B2 * | 6/2005 | Jost | 297/188.04 |
| 6,986,190 | B2 * | 1/2006 | Jost | 29/91.1 |
| 7,019,794 | B2 * | 3/2006 | Norvell et al. | 348/838 |
| 7,040,697 | B1 * | 5/2006 | Tuccinardi et al. | 297/217.3 |
| 7,066,544 | B2 * | 6/2006 | Tseng | 297/391 |
| 7,407,227 | B1 * | 8/2008 | Tuccinardi et al. | 297/217.3 |
| 7,597,393 | B1 * | 10/2009 | Tuccinardi et al. | 297/217.3 |
| 2004/0004378 | A1 * | 1/2004 | Park et al. | 297/217.3 |
| 2006/0097551 | A1 * | 5/2006 | Park et al. | 297/217.3 |
| 2007/0001492 | A1 * | 1/2007 | Chang | 297/217.3 |
| 2007/0052266 | A1 * | 3/2007 | Chu | 297/217.3 |
| 2007/0101372 | A1 * | 5/2007 | Chang | 725/75 |
| 2008/0157574 | A1 * | 7/2008 | LaRussa | 297/217.3 |
| 2008/0246319 | A1 * | 10/2008 | Chang | 297/217.3 |
| 2008/0246320 | A1 * | 10/2008 | Chang | 297/217.3 |
| 2008/0252118 | A1 * | 10/2008 | Chang | 297/217.3 |
| 2009/0115233 | A1 * | 5/2009 | Tuccinardi et al. | 297/217.3 |
| 2009/0127897 | A1 * | 5/2009 | Watanabe et al. | 297/188.04 |
| 2011/0133530 | A1 * | 6/2011 | Chang | 297/217.3 |
| 2012/0139307 | A1 * | 6/2012 | Westerink et al. | 297/217.3 |

FOREIGN PATENT DOCUMENTS

KR 2010001722 * 2/2010

* cited by examiner

Primary Examiner — David Dunn
Assistant Examiner — David E Allred
(74) Attorney, Agent, or Firm — Raymond Y. Chan; David and Raymond Patent Firm

(57) ABSTRACT

A vehicle seat head rest for mounting to a vehicle seat of a vehicle includes a head pillow and an electronic appliance including a screen module detachably mounted at the head pillow. The head pillow includes a pillow body having a receiving cavity formed at the rear side of the pillow body, a mounting arrangement for mounting to the vehicle seat, and a replaceable skin detachably encasing the pillow body at a position that a peripheral edge of the replaceable skin is folded at the rear side of the pillow body. The screen module is detachably mounted within the receiving cavity and is supported by an interior wall thereof. Thus, the peripheral edge of the replaceable skin is hidden after the screen module is detachably mounted at the rear side of the head pillow.

6 Claims, 4 Drawing Sheets

VEHICLE SEAT HEAD REST WITH BUILT-IN ELECTRONIC APPLIANCE

BACKGROUND OF THE PRESENT INVENTION

1. Field of Invention

The present invention relates to a vehicle seat head rest, and more particularly to a vehicle seat head rest with a built-in electronic appliance, which provides the electronic appliance being detachably mounted at the rear side of the head rest and the replaceable skin to be interchanged for matching with the material of the vehicle seat.

2. Description of Related Arts

A conventional head rest for car seat comprises a head pillow and two parallel supporting rods downwardly extended from the head pillow to slidably engage with two retention slots of the car seat. Accordingly, as different car models have different sizes of car seat, a specific dimensioned head rest might be tailor-made for the specific car seat. In other words, the distance between the two supporting rods of the head rest must match with a distance between the two retention slots of the car seat. Therefore, the driver cannot selectively switch the head rest from one car to another car.

In addition, most cars are modified to install a LCD screen at the rear side of the head rest for entertainment, so that the LCD screen can provide the car entertaining for the back seat passengers, such as for kids watching cartoons. However, the LCD screen must be incorporated with the original manufactured head rest. Since the original manufactured head rest is mainly made for supporting the head of the driver, the LCD screen does not provide any rigid frame structure to support LCD screen.

In other words, the problem of the head rest is that the LCD screen may be damaged by the vibration and external shocks from the vehicle. This happens because the supporting frame which holds the LCD screen provides a lot of freedom for the LCD screen to move around inside the head rest and thus damaging the electronic components of the LCD screen.

Therefore, the built-in LCD screen built-in the head rest to form a part of the head rest can be barely detached for replacement or repair purpose. It will cost a lot for repairing the LCD screen due to the vast installation process. Some models of the car may not even have an upgraded option for installing the LCD screen, DVD player, or any other electronic appliances for installing at the rear side of the vehicle seat head rest.

In order to provide the electronic appliance incorporating with head rest of any vehicle, after market provides the options for purchasing the car electronic appliance, so that the driver of the car is able to purchase the electronic appliances, such as LCD screen, to incorporate with the car he/she owns. However, a cavity is formed at the rear side of the original head rest of the vehicle seat for receiving and built-in the LCD screen within the cavity. The installation structure not only damages the original head rest, but also has high installation cost for installing the LCD screen.

Some of the LCD screen for incorporating with the head rest of vehicle may be not require any installation. For example, the LCD screen can be attached on the rear side of the head rest via a strip attached with the LCD screen to tie on the head rest, so that the LCD screen requires no installations and can be easily and detachably attached onto the head rest.

This type of after market vehicle LCD screen of electronic appliances has significant drawbacks as follows. Firstly, the color and material of element for detachably mounting the LCD screen with the vehicle head rest will not match the color and texture of the original cover of the head rest. Also, the LCD screen tends to protrude out of the rear side of the vehicle head rest. It is not only ugly in visual appearance of the vehicle head rest, but also relatively dangerous. The backseat passengers may hit the rigid edge of the LCD screen protruding out of the head rest while the car is moving. Furthermore, the wires for operatively connecting the power or electronic system of the vehicle with the LCD screen are disposed in the vehicle. Therefore, the passengers may be tripped by the exposed wires or cables.

The LCD screen with built-in vehicle head rest, in order to overcome the above drawbacks, is provided in the after market, so that the buyer is able to replace the entire original vehicle head rest to the new head rest set with built-in LCD screen. Therefore, no complicated installation is required. The buyer is able to simply mount the head rest set with built-in LCD screen to the vehicle seat by two supporting arms.

For the built-in LCD screen head rest set, there are still few main concerns. The buyer may have to order the head rest set in relation to the individual vehicle seat, such as the color and texture of the skin of the vehicle seat, and the distance between two supporting arms of the head rest to mount onto the vehicle seat. The manufacturing process has to match each of the individual vehicle seats, so that it increases the manufacturing cost. The built-in LCD screen also has the same drawbacks as the original head rest from original car manufacturer with the built-in LCD screen, such as difficult to access the circuit for repairing.

Additionally, if the driver purchased another new car, the head rest set with built-in LCD in the after market may not be matched the color and texture of the owner's new vehicle seat cover. Therefore, the owner has to either purchase another new head rest set, or transfer the old head rest set to the new vehicle seat, which is not matching the color and texture of the seat cover. The distance between two parallel supporting arms downwardly extended from the head rest for mounting to the vehicle seat may not be matched the two retention slot on the top of the vehicle seat, such that the used head rest set with built-in LCD screen may not be able to used in the new vehicle seat.

SUMMARY OF THE PRESENT INVENTION

A main object of the present invention is to provide a vehicle seat head rest with a built-in electronic appliance, which provides the electronic appliance being detachably mounted at the rear side of the head rest and the replaceable skin to be interchanged for matching with the material of the vehicle seat.

Another object of the present invention is to provide a vehicle seat head rest with a built-in electronic appliance, wherein the peripheral edge of the replaceable skin is hidden after the electronic appliance is detachably mounted at the rear side of the head rest to form a built-in screen configuration at the rear side of the head rest.

Another object of the present invention is to provide a vehicle seat head rest with a built-in electronic appliance, wherein the detachably coupling arrangement enables the electronic appliance detachably being supported within the receiving cavity to substantially form the same rear side surface of the pillow body as a built-in electronic appliance without protruding out of the rear side of the pillow.

Another object of the present invention is to provide a vehicle seat head rest with a built-in electronic appliance, wherein supporting frame is able to minimize the damaging of the electronic appliance from vibration and external shocks while the vehicle is experiencing obstacles along the road.

Another object of the present invention is to provide a vehicle seat head rest with a built-in electronic appliance, wherein the two hollow mounting arms is downwardly extended from the bottom side of the pillow body for detachably inserting into the vehicle seat and selectively adjusting the distance between two mounting arms, so as to universally insert into most of the vehicle seat.

Another object of the present invention is to provide a vehicle seat head rest with a built-in electronic appliance, wherein the power cable or other cables of the electronic appliance are able to extend through at least one of the hollow mounting arms, so as to conceal the power cable within the respective mounting arm in a hidden manner.

Another object of the present invention is to provide a vehicle seat head rest with a built-in electronic appliance, which dose not require to alter the original structural design of the vehicle seat, so as to minimize the manufacturing cost of the vehicle seat incorporating with the vehicle seat head rest of the present invention.

Another object of the present invention is to provide a vehicle seat head rest with a built-in electronic appliance, wherein no expensive or complicated structure is required to employ in the present invention in order to achieve the above mentioned objects. Therefore, the present invention successfully provides an economic and efficient solution for providing the electronic appliance being detachably mounted at the rear side of the head rest and the replaceable skin to be interchanged for matching with the material of the vehicle seat.

Accordingly, in order to accomplish the above objects, the present invention provides a vehicle seat head rest for mounting on a vehicle seat of a vehicle, which comprises a head pillow and an electronic appliance.

The head pillow comprises a pillow body having a receiving cavity indently formed at a rear side of the pillow body, a mounting arrangement extended from the pillow body for mounting to the vehicle seat, and a replaceable skin detachably encasing the pillow body at a position that a peripheral edge of the replaceable skin is folded at the rear side of the pillow body.

The electronic appliance comprises a screen module detachably mounted at the rear side of the pillow body within the receiving cavity thereof and supported by an interior wall of the receiving cavity. The peripheral edge of the replaceable skin is hidden after the screen module is detachably mounted at the rear side of the pillow body to form a built-in screen configuration at the rear side of the pillow body.

These and other objectives, features, and advantages of the present invention will become apparent from the following detailed description, the accompanying drawings, and the appended claims.

DETAILED DESCRIPTION OF THE PREFERRED EMBODIMENT

Figure 1:
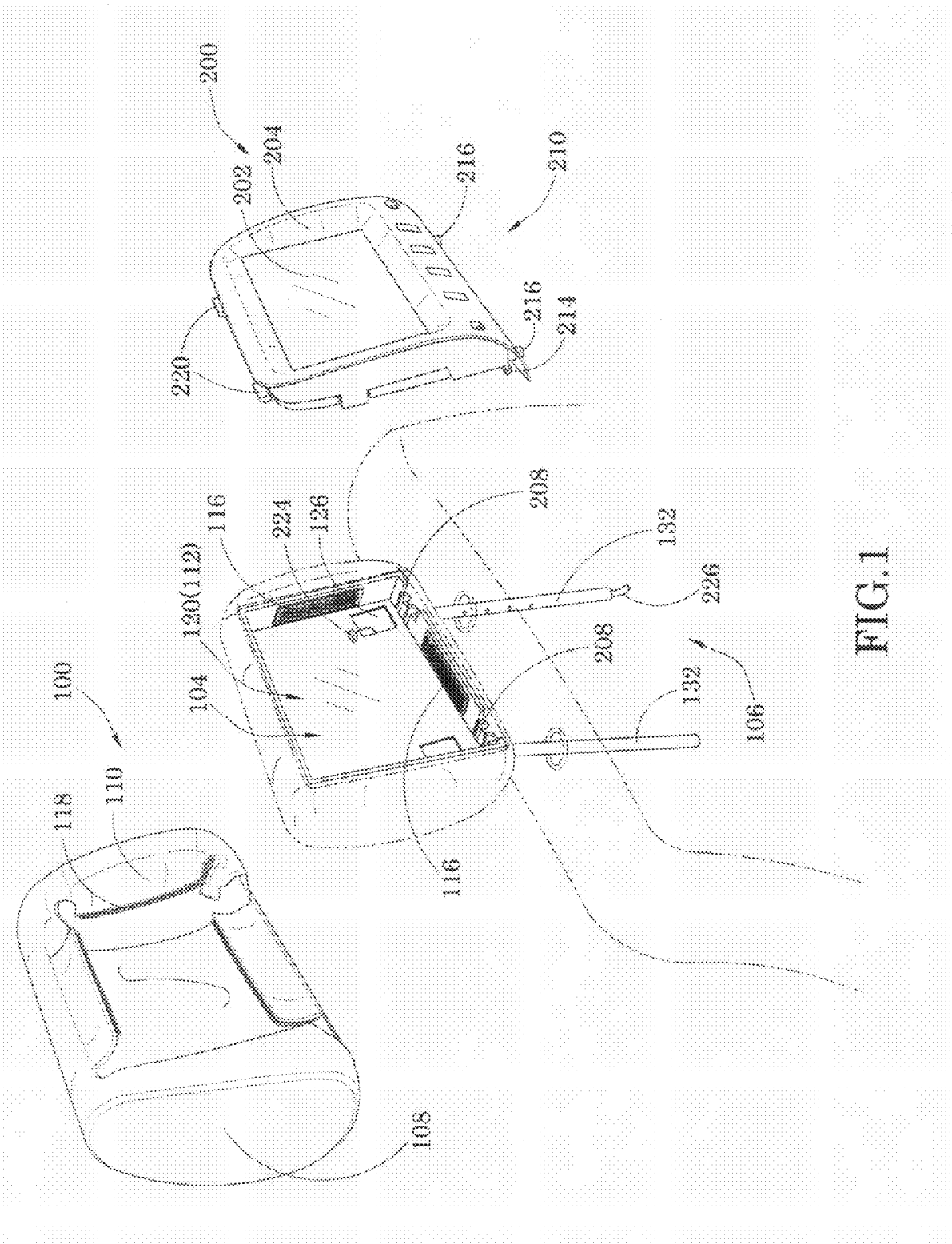
FIG. 1 is an exploded perspective view of a vehicle seat head rest with a built-in electronic appliance according to a preferred embodiment of the present invention.
Figure 2:
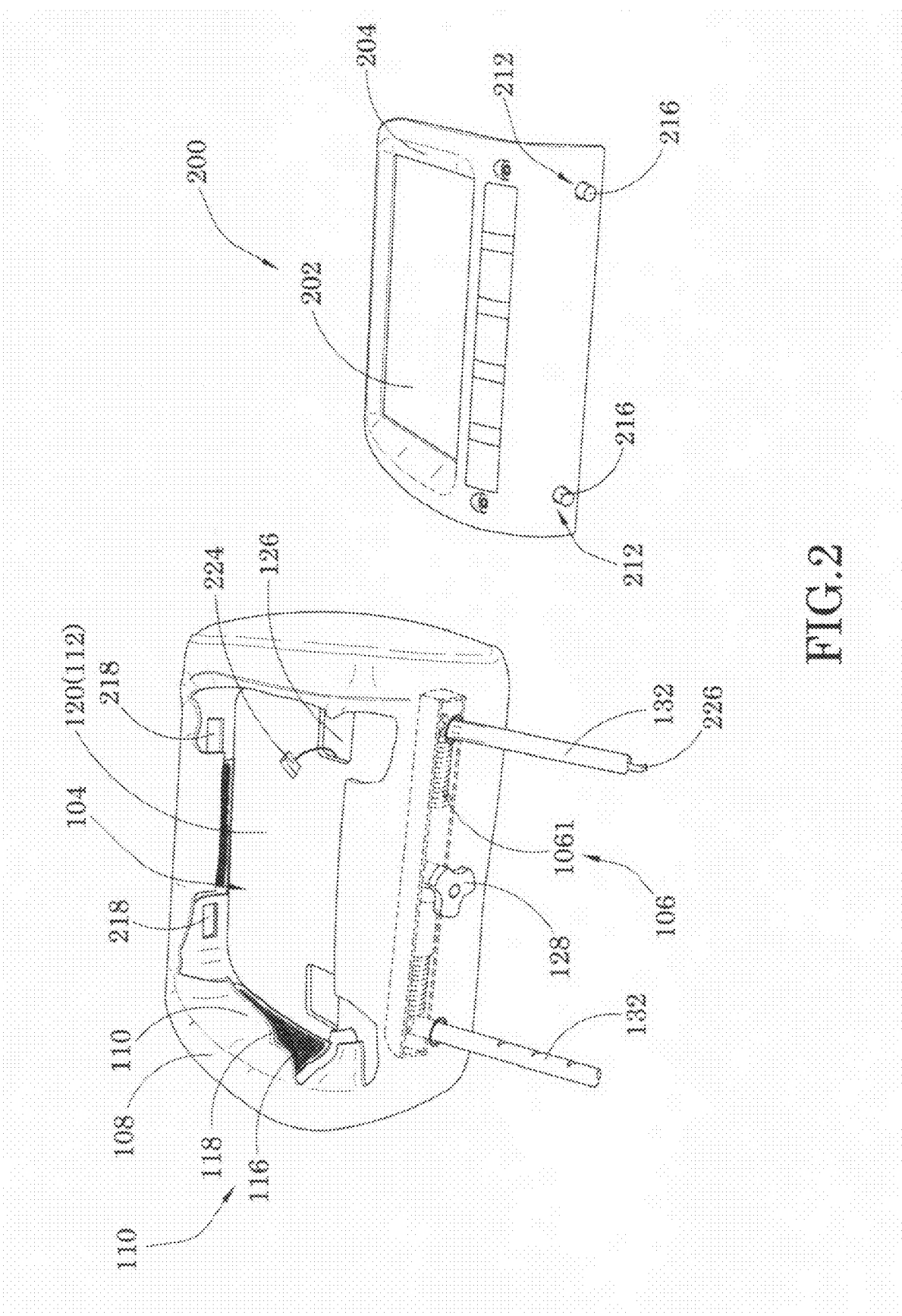
FIG. 2 is a perspective view of the vehicle seat head rest according to the above preferred embodiment of the present invention, illustrating the peripheral edge of the replaceable skin being folded into and fastened at the receiving cavity of the head rest.
Figure 3:
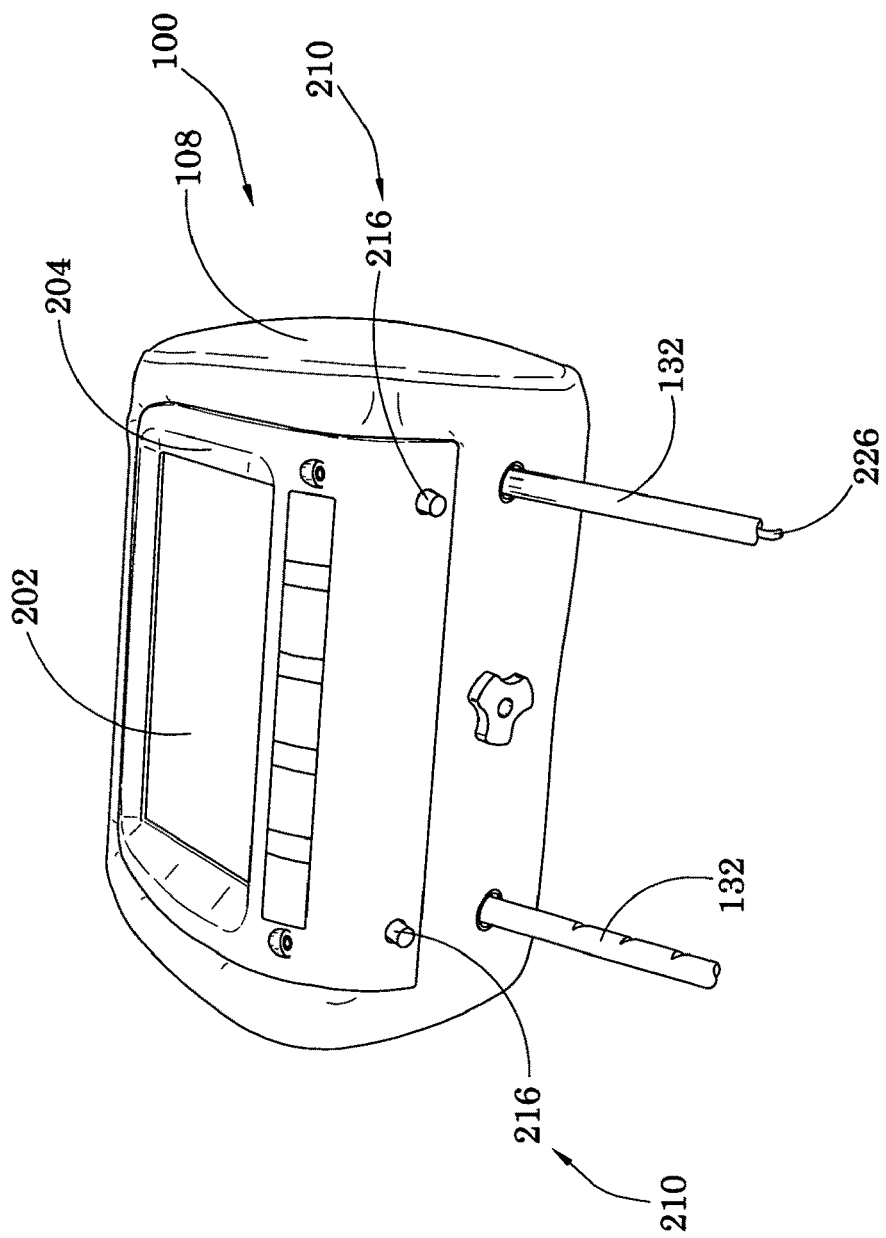
FIG. 3 is a perspective view of the vehicle seat head rest according to the above preferred embodiment of the present invention, illustrating the electronic appliance mounted at the rear side of the head rest to form a built-in screen configuration at the rear side of the head rest.

Referring to FIGS. 1 to 4 of the drawings, a vehicle seat head rest for mounting on a vehicle seat of a vehicle according to a preferred embodiment of the present invention is illustrated, wherein the vehicle seat head rest comprises a head pillow 100 and an electronic appliance 200.

The head pillow 100 comprises a pillow body 102 having a receiving cavity 104 indentedly formed at a rear side of the pillow body 102, a mounting arrangement 106 extended from the pillow body 102 to mount the head pillow 100 onto the vehicle seat of vehicle, and a replaceable skin 108 for detachably encasing the pillow body 102 at a position that a peripheral edge 110 of the replaceable skin 108 is folded at the rear side of the pillow body 102.

The electronic appliance 200 comprises a screen module 202, which is detachably mounted at the rear side of the pillow body 102 within the receiving cavity 104 thereof. In order to stably supporting the screen module 202 of the electronic appliance 200 within the receiving cavity 104 and limit a free space between the screen module 202 and the receiving cavity 104, an interior wall 112 of the receiving cavity 104 is preferably provided to support the screen module 202 within the receiving cavity 104.

Accordingly, the peripheral edge 110 of the replaceable skin 108 of the head pillow 100 is hidden after the screen module 202 of the electronic appliance 200 is detachably mounted at the rear side of the pillow body 102, such that the head pillow 100 and the electronic appliance 200 are formed a built-in screen configuration at the rear side of the head pillow 100. Meanwhile, the electronic appliance 200 is able to be detachably mounted on the pillow body 102 of the head pillow 100, and the replaceable skin 108 is able to be detachably replaced by another skin. It is worth to mention that the detachable screen module 202 simplifies the installation of the electronic appliance 200 and enables the screen module to be easily detached from the head pillow 100 for repairing or replacing. The replaceable skin 108 enables a user to replace another skin which has a color and texture matching the user's new vehicle seat appearance when the user purchased another new vehicle.

In the presently preferred embodiment, the head pillow 100 has a cushion portion for softly and comfortably supporting the head of the user, i.e. the driver or the passenger, wherein the replaceable skin 108 is arranged to encase the cushion portion to match with the seat of the vehicle.

The head pillow 100 further comprises a concealed attachment 114 for securely encasing the pillow body 102 within the replaceable skin 108. The concealed attachment 114 preferably comprises a first fastener 116 provided at the interior wall 112 within the receiving cavity 104 and a second fastener 118 which is provided at the peripheral edge 110 of the replaceable skin 108, such that the first fastener 116 is detachably fastened with the second fastener 118, to detachably encasing the pillow body 102 within the replaceable skin 108. Therefore, when the pillow body 102 is encased within the replaceable skin 108, the peripheral edge 110 of the replaceable skin 108 is folded into the receiving cavity 104 and is sheltered by the screen module 202.

The replaceable skin 108 is preferably sized and shaped to fittely fit the configuration of the pillow body 102 of the head pillow 100, such that when the replaceable skin 108 is folded to encase the pillow body 102 from the front side thereof, the peripheral edge 110 of the replaceable skin 108 is folded toward the interior wall 112 of the receiving cavity 104. Therefore, the peripheral edge 110 of the replaceable skin 108 placed within the receiving cavity 104. When the screen module 202 fits into the receiving cavity 104, the screen module 202 is able to form the built-in screen configuration of the vehicle seat head rest, and to form as part of the pillow body 102 having the color and texture matching the vehicle seat. Through first and second fasteners 116, 118 of the concealed attachment 114, the replaceable skin 108 is able to relatively more secure to detachably encasing the pillow body 102.

As will be appreciated by one skilled in the art, the peripheral edge 110 of the replaceable skin 108 is able be hidden in any other modifications within the same spirit and scope of the preferred embodiment after being sheltered by the screen module 202. For examples, the peripheral edge 110 of the replaceable skin 108 may be folded at the rear side of the pillow body 102 and hidden by a covering frame 204 of the screen module 202 of the electronic appliance 200, which is outwardly extended from the periphery of the screen module 202, in such a manner that the concealed attachment 114 may be used for retaining the replaceable skin 108 in position. The replaceable skin 108 may be encasing the pillow body 102 and retained in position via the covering frame 204 in a hidden manner. Or a "T" shaped reinforcing rim may further provided for inserting into a gap between the peripheral edge 110 of the replaceable skin 108 and the peripheral edge of the screen module 202, so that the peripheral edge 110 of the replaceable skin 108 is able to be retained in position and hidden via the "T" shaped reinforcing rim.

As mentioned above, the first fastener 116 is embodied as one or more hook fasteners, and the second fastener 118 is embodied as one or more loop fasteners in relation to the hook fasteners of the first fastener 116. In other words, the hook fasteners of the first fastener 116 are spacedly provided at the interior wall 112 of the receiving cavity 104. The loops fasteners of the second fastener 118 are spacedly provided at the peripheral edge 110 of the replaceable skin 108 at an inner side thereof, wherein the loops fasteners of the second fastener 118 are located at a position corresponding to the hook fasteners of the first fastener 116 for detachably fastening with each other, so as to encasing the pillow body 102 in the hidden manner.

It will be appreciated that the hook and loop fasteners are interchangeable, and are one of the example for detachably encasing the pillow body 102 via folding the peripheral edge 110 of the replaceable skin 108 through the first and second fasteners 116, 118 in the hidden manner. The first and second fasteners 116, 118 could be any other types of fasteners for detachably retaining the peripheral edge folded at the rear side of the pillow body 102 in position.

As described above, the electronic appliance 200 further comprises a detachable coupling arrangement 206 for detachably retaining the screen module 202 at the rear side of the pillow body 102 of the head pillow 100 to form the built-in screen configuration of head pillow 100. More specifically, the detachable coupling arrangement 206 preferably comprises one or more engaging slots 208 located within the receiving cavity 104 and one or more corresponding releasable lockers 210 provided at a peripheral of the screen module 202 of the electronic appliance 200 to detachably couple with the engaging slots 208, so as to detachably mount the screen module 202 at the rear side of the pillow body 102.

In the presently preferred embodiment, the engaging slots 208 and the releasable lockers 210 may preferably locate at a bottom side of the receiving cavity 104 and the peripheral of the screen module 202 respectively, such that the detachable coupling arrangement 206 may be hidden as if the screen module 202 of the electronic appliance is originally built-in with the pillow body 102. One skill in the art will understand that the engaging slots 208 and the releasable lockers 210 may be provided at any location, preferably at the peripheral of the screen module 202, for detachably and securely mounting the screen module 202 within the receiving cavity 104 of the pillow body 102.

Figure 4:
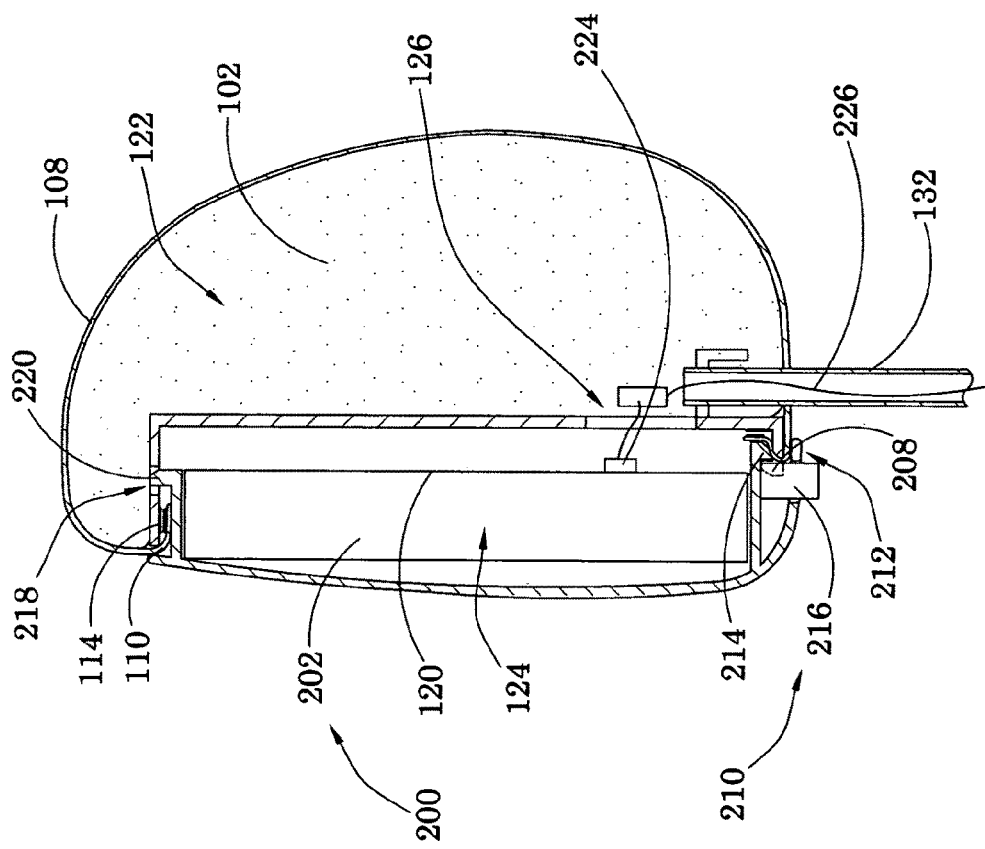
FIG. 4 is a sectional view of the vehicle seat head rest according to the above preferred embodiment of the present invention, illustrating the detachable coupling arrangement of the electronic appliance.

More specifically, each of the releasable lockers 210 further comprises a through slot 212 formed at the bottom side of the screen module 202 and comprises a clipping member 214 forwardly extended from the screen module 202 to detachably engage at the respective engaging slot 208, as shown in FIG. 4. In order to conveniently detach the screen module 202, each of the releasable lockers 210 further comprises a releasable button 216 downwardly extended from the clipping member 214 through the through slot 212, such that when the releasable button 216 is upwardly pressed, the clipping member 214 is disengaged with the respective engaging slot 208, so as to enable the screen module 202 being detached from the rear side of the pillow body 102.

As will be readily appreciated, the detachable coupling arrangement 206 comprising the engaging slots 208 and releasable lockers 210 is illustrated as one of the examples of detachable coupling arrangement 206 for releasably mounting the screen module 202. For examples, the releasable lockers 210 may be a knob for rotatably offset with the engaging slot 208 for mounting the screen module 202 with the pillow body 102, and rotatably align the releasable locker 210 with the engaging slot 208 via the knob to release the engagement between the releasable locker 210 and the engaging slot 208, so as to detach the screen module 202 from the rear side of the pillow body 102.

The detachable coupling arrangement 206 further comprises one or more positioning slots 218 provided at the interior wall 112 of the receiving cavity 104 and comprises one or more hooking members 220 rearwardly extended from the screen module 202 at a position in respective with the positioning slots 218 to detachably couple with the positioning slots 218, so as to provide a relatively more secure mounting arrangement to retain the screen module 202 in position.

Accordingly, the positioning slots 218 are preferably provided at an upper side of the interior wall 112 of the receiving cavity 104, which is at an opposite position in relation to the engaging slots 208 and the releasable lockers 210 preferably provided at the bottom side of the interior wall 112 and bottom side of the screen module 202 respectively. Therefore, the positioning slots 218 and the hooking members 220 not only reinforcingly and securely retain the screen module 202 in position, but also position and guide the screen module 202 to detachably couple the engaging slots 208 with the releasable lockers 210.

In order to prevent the lateral movement and stably supporting the screen module 202 within the receiving cavity 104, the head pillow 100 further comprises a supporting frame 112 preferably provided to securely coupling within the receiving cavity 104 to form the interior wall 112 of the receiving cavity 104. The supporting frame 112 also divides the receiving cavity 112 into a module cavity 122 in front of the interior wall 112 of the receiving cavity 104, and a screen cavity 124 indently formed at the rear side of the pillow body 102.

The supporting frame 120 is preferably made by rigid material, such as plastic, metal, or any other material that can form a rigid shape or configuration, so that the screen cavity 124 of the supporting frame 120 is able to rigidly support the screen module 202 at the interior wall 112 within the screen cavity 124. Thus, the screen module 202 is rigidly and stably mounted at the rear side of the pillow body 102 through the engaging slot 208 and the positioning slots 218 at the interior wall 112 formed within the supporting frame 120, so as to prevent the damaging from vibration and external shocks while the vehicle experiences obstacles along the road.

Accordingly, the supporting frame 120 affixed with the cushion portion of the pillow body 102 to form the module cavity 122 between the cushion portion and the supporting frame 120 at the rear side of the pillow body 102, and defining the screen cavity 124 indented at the rear side of the pillow body 102. The supporting frame 120 may be securely enveloped with the cushion portion via an interior layer encasing the cushion portion at a position that a peripheral edge of the interior layer is folded at the interior wall 112 of the supporting frame 120, such that the cushion portion and the supporting frame 120 forms the pillow body with the receiving cavity 104 at the rear side thereof and defining the interior wall 112 therewithin.

It is worth to mention that the screen module 202 of the electronic appliance 200 may be detachably mounted at the rear side of the head pillow 100, wherein the skin of the pillow may be affixed on the pillow body to become an irreplaceable skin encasing the pillow body.

In the preferred embodiment of the present invention, the electronic appliance 200 further comprises a control module 222 disposed in the pillow body 102 to operatively connect with the screen module 202 in a detachably connecting manner. The control module 222 further comprises a communicating terminal 224 and a power cable 226. The communicating terminal 224 is extended through a communication slot 126 at the interior wall 112 to operatively connect to the screen module 202 in a detachably connecting manner. The power cable 226 is extending through an interior of the mounting arrangement 106 in a hidden manner for electrically connecting to a power source of the vehicle.

More specifically, the power cable 226 is extended to operatively connect with the communicating terminal 224 of the control module 222 to electrically link to the electronic appliance 200 for providing the power source thereto. The control module 222 may further comprises one or more cables integrally formed with the power cable 226 and operatively connect to the communicating terminal 224, so that the electronic appliance 200 is able to electrically link with other vehicle electronics or features, such as DVD player of the vehicle or vehicle built-in GPS system for being displayed on the screen module 202 of the electronic appliance 200. It is worth mentioning that a mini computer as one of the electronic appliance 200 can be detachably mounted to the rear side of the head pillow 100 such that the passenger sitting at the back of the vehicle is able to use the mini computer without putting the mini computer on his or her lap.

The mounting arrangement 106 comprises a length-adjustable sliding guider 1061 longitudinally supported within the pillow body 102 at the bottom portion thereof, two mounting arms 132 downwardly and parallelly extended from the bottom of the pillow body 102 for slidably insert into the vehicle seat, and an adjuster 128 provided at the sliding guider 1061 to selectively adjust the distance between the mounting arms 132. Therefore, when the distance of the mounting arms 132 is adjusted corresponding to a distance between the two retention slots of the vehicle seat, the two mounting arms 132 are adapted for slidably engaging with the two retention slots respectively so as to securely support the head pillow 100 on the vehicle seat.

Accordingly, the mounting arms 132 are coupled with the sliding guider 1061, wherein when the adjuster 128 is turned clockwise, the sliding guider 1061 is driven to rotate at one direction to reduce the distance between the mounting arms 132. Likewise, when the adjuster 128 is turned counter clockwise, the sliding guider 1061 is driven to rotate at an opposed direction to lengthen the distance between the mounting arms 132.

It is worth to mention that the adjuster 128 enables to adjust the distance between two hollow mounting arms 132, so that the head pillow 100 of the vehicle seat head rest is able to mount onto any vehicle seats as a universal head pillow. In addition, the user is able to detach the head pillow 100 from one vehicle and mount it onto another vehicle seat.

Therefore, the power cable 226 operatively connected to the communicating terminal 224 is able to extend through at least one of the mounting arms 132 to electrically connect the electronic appliance with the power system and/or other electronic device of the vehicle, such that the power cable is concealed within the respective mounting arm 132 in a hidden manner. It is worth to mention that the concealed power cable or other cables linking to the electronic appliance 200 not only enhances the built-in screen configuration, but also increases the safety of the vehicle.

It will be appreciated that the adjustably mounting arms 132 is illustrated as one of the examples of the mounting arrangement 106. The pillow body 102 may be able to mount on the vehicle seat via two fixed mounting arms or one fixed mounting arm. The adjustable distance between two mounting arms 132 is able to firmly and stably support the head pillow 100 while being the universal head pillow 100 for mounting with variety of vehicle seat.

Accordingly, the vehicle seat head rest with built-in screen configuration of the screen module 202 of the electronic appliance 200 is able to conveniently mount onto any vehicle seat via the adjustable two hollow mounting arms 132 and the replaceable skin 108 for matching variety of color and texture of vehicle seats, such that the user is able to detach the head rest and mount onto a new vehicle. The manufacturing process is also simplified. The manufacture is able to mass produce the head pillow 100 without meet the individual requirement of the color and texture of the individual vehicle seat cover, and the specific distance between two rods of each of individual vehicle.

The peripheral edge of the replaceable skin 108 is able to fittedly encase the pillow body 102 in the hidden manner, so as to enhance the built-in screen configuration as if a real built-in electronic appliance and increase the safety.

The detachable coupling arrangement 206 enables the electronic appliance being detached for repair or replace, so as to decrease the installation cost.

The supporting frame 120, the receiving cavity 104, and the detachable coupling arrangement 206 enables the electronic appliance 200 detachably formed a substantially flat surface at the rear side of the pillow body 102 without a substantially protruding out of the rear side surface of the pillow body 102, so as to prevent a passenger hit the rigid edges of the screen module 202 when the vehicle experiences obstacles while driving on the road.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle seat head rest for mounting on a vehicle seat of a vehicle, comprising:

a head pillow comprising a pillow body having a receiving cavity formed at a rear side of said pillow body, a mounting arrangement extended from said pillow body for mounting to said vehicle seat, and a replaceable skin detachably encasing said pillow body at a position that a peripheral edge of said replaceable skin is folded at said rear side of said pillow body; and an electronic appliance comprising a screen module which is detachably mounted at said rear side of said pillow body within said receiving cavity thereof and is supported by an interior wall of said receiving cavity, wherein said peripheral edge of said replaceable skin is hidden after said screen module is detachably mounted at said rear side of said pillow body to form a built-in screen configuration at said rear side of said head pillow;

wherein said electronic appliance further comprises a detachable coupling arrangement which comprises one or more engaging slots spacedly formed at said interior wall of said receiving cavity and one or more corresponding releasable lockers provided at a periphery of said screen module to detachably couple with said engaging slots so as to detachably mount said screen module at said rear side of said pillow body;

wherein each of said releasable lockers has a through slot formed at a bottom side of said screen module and comprises a clipping member forwardly extended from said screen module to detachably engage at said engaging slot and a releasable button downwardly extended from said clipping member through said through slot such that when said releasable button is pressed upwardly, said clipping member is disengaged with said respective engaging slot so as to enable said screen module being detached from said rear side of said pillow body.

2. A vehicle seat head rest for mounting on a vehicle seat of a vehicle, comprising:

a head pillow comprising a pillow body having a receiving cavity formed at a rear side of said pillow body, a mounting arrangement extended from said pillow body for mounting to said vehicle seat, and a replaceable skin detachably encasing said pillow body at a position that a peripheral edge of said replaceable skin is folded at said rear side of said pillow body; and an electronic appliance comprising a screen module which is detachably mounted at said rear side of said pillow body within said receiving cavity thereof and is supported by an interior wall of said receiving cavity, wherein said peripheral edge of said replaceable skin is hidden after said screen module is detachably mounted at said rear side of said pillow body to form a built-in screen configuration at said rear side of said head pillow;

wherein said head pillow further comprises a concealed attachment comprising a first fastener provided at said interior wall of said receiving cavity and a second fastener which is provided at said peripheral edge of said replaceable skin and is detachably fastened with said first fastener, such that when pillow body is encased within said replaceable skin, said peripheral edge of said replaceable skin is folded into said receiving cavity and is sheltered by said screen;

wherein said electronic appliance further comprises a detachable coupling arrangement which comprises one or more engaging slots spacedly formed at said interior wall of said receiving cavity and one or more corresponding releasable lockers provided at a periphery of said screen module to detachably couple with said engaging slots so as to detachably mount said screen module at said rear side of said pillow body;

wherein each of said releasable lockers has a through slot formed at a bottom side of said screen module and comprises a clipping member forwardly extended from said screen module to detachably engage at said engaging slot and a releasable button downwardly extended from said clipping member through said through slot such that when said releasable button is pressed upwardly, said clipping member is disengaged with said respective engaging slot so as to enable said screen module being detached from said rear side of said pillow body.

3. The vehicle seat head rest, as recited in claim 2, wherein said detachable coupling arrangement further has one or more positioning slots provided at an upper side of said interior wall of said receiving cavity and comprises one or more hooking members rearwardly extended from said screen module to detachably couple with said positioning slots so as to retain said screen module in position.

4. The vehicle seat head rest, as recited in claim 3, wherein said head pillow further comprises a supporting frame securely coupling within said receiving cavity to form said interior wall of said receiving cavity and to divide said receiving cavity into a module cavity in front of said interior wall, and a screen cavity indently formed at said rear side of said pillow body for rigidly supporting said screen module at said interior wall within said screen cavity.

5. The vehicle seat head rest, as recited in claim 4, wherein said electronic appliance further comprises a control module disposed in said pillow body to operatively connect with said screen module in a detachably connecting manner, wherein said control module comprises a terminal cable extended through a communication slot at said interior wall to operatively connect to said screen module in a detachably connecting manner and a power cable extending through an interior of said mounting arrangement in a hidden manner for electrically connecting a power source of the vehicle.

6. The vehicle seat head rest, as recited in claim 5, wherein said mounting arrangement comprises two hollow mounting arms downwardly and parallelly extended from said pillow body for detachably inserting into said vehicle seat, wherein said power cable is extended through one of said mounting arms so as to conceal said power cable within said respective mounting arm in a hidden manner.

* * * * *